(12) United States Patent
Osawa

(10) Patent No.: US 7,521,824 B2
(45) Date of Patent: Apr. 21, 2009

(54) CONTACTOR CONTROL APPARATUS AND CONTACTOR CONTROL METHOD FOR USE IN ELECTRIC VEHICLE

(75) Inventor: Ken Osawa, Toyohashi (JP)

(73) Assignee: Panasonic EV Energy Co., Ltd., Kosai-Shi (JP)

(*) Notice: Subject to any disclaimer, the term of this patent is extended or adjusted under 35 U.S.C. 154(b) by 387 days.

(21) Appl. No.: 11/258,343

(22) Filed: Oct. 25, 2005

(65) Prior Publication Data

US 2006/0087775 A1    Apr. 27, 2006

(30) Foreign Application Priority Data

Oct. 25, 2004    (JP) .......................... P 2004-309674

(51) Int. Cl.
*H01H 47/00*    (2006.01)
(52) U.S. Cl. ........................................ 307/130; 307/9.1
(58) Field of Classification Search ................ 307/10.7, 307/130, 9.1; 320/104
See application file for complete search history.

(56) References Cited

U.S. PATENT DOCUMENTS 6,885,745 B1 *    4/2005    Handforth et al. ........... 379/412
7,157,658 B2 *    1/2007    Chaskin .................... 219/85.15
2001/0040441 A1 *    11/2001    Ng et al. .................... 320/104
2002/0050809 A1 *    5/2002    Uchida ........................ 320/149
2004/0143382 A1 *    7/2004    Ishida .......................... 701/36

FOREIGN PATENT DOCUMENTS

JP         10224901         8/1998
JP         2000348777 A  *  12/2000

* cited by examiner

*Primary Examiner*—Albert W Paladini
*Assistant Examiner*—Daniel Cavallari
(74) *Attorney, Agent, or Firm*—Workman Nydegger

(57) ABSTRACT

A contactor control apparatus is provided for controlling contactors connected to a battery assembly. A contactor control apparatus includes a controller for turning on and off a first contactor connected to one end of a battery assembly having at least one secondary battery connected in series and a second contactor connected to another end of the battery assembly. The controller counts a first counter value when a control voltage for controlling each contactor is higher than a first reference voltage, and holds the first counter value when the control voltage is lower than or equal to the first reference voltage. The controller turns off at least one of the first contactor and the second contactor when the first counter value is equal to or higher than a first threshold value.

6 Claims, 12 Drawing Sheets

CONTACTOR CONTROL APPARATUS AND CONTACTOR CONTROL METHOD FOR USE IN ELECTRIC VEHICLE

BACKGROUND OF THE INVENTION

1. Field of the Invention

The present invention relates to a contactor control apparatus for controlling contactors connected to a battery assembly. In particular, the present invention relates to a contactor control apparatus controlling contactors according to a counter value.

2. Description of the Related Art

In recent years, a power-supply apparatus using a secondary battery such as a nickel-metal hydride battery having a high energy density (hereinafter, referred to as "a nickel-hydrogen battery") is used as a power source of a motor and a drive source for various types of loads in an electric vehicle such as a pure electric vehicle (hereinafter, referred to as "PEV"), a hybrid electric vehicle (hereinafter, referred to as "HEV") or the like. The power-supply apparatus for use in the electric vehicle requires a total voltage of approximately 100V to 350V. Since an output voltage of a single battery (a cell) as a minimum unit constituting the power-supply apparatus is approximately 1.2V, a plurality of single batteries (for example, 100 single batteries) is conventionally connected in series so as to obtain a desired total voltage.

A contactor (relay) for connecting and disconnecting the power supply is provided between the power-supply apparatus and the motor. For example in the PEV, when a driver operates an ignition key to turn on an ignition and turn on the power supply, the contactor is conducted to connect the power-supply apparatus, and as a result, the motor is driven to rotate. When the ignition is turned off, the contactor disconnects the power-supply apparatus and the motor from each other, and as a result, the motor is stopped.

The contactor includes a moving contact and a fixed contact, and further includes a contactor coil for operating the moving contact. In general, the contactor used in the PEV and HEV applies a voltage of an auxiliary power supply that outputs a relatively low voltage, which is generally called an auxiliary battery, to the contactor coil to switch over conductive state and non-conductive state.

However, the auxiliary battery, which is detachably provided in the electric vehicle, may be removed for maintenance or the like or exchanged. If an inappropriate auxiliary battery is mounted or in any similar case, the contactor coil may excessively generate heat and be damaged when a voltage of the auxiliary power supply exceeding a rated voltage of the contactor coils is applied to the contactor coil for a long time interval. The excessive heat generation and the damage of the contactor coil cause malfunctions of the entire electric vehicle.

The Japanese patent laid-open publication No. 10-224901 discloses a contactor control apparatus of a prior art. Referring to FIGS. 11 and 12, the contactor control apparatus of the prior art is described. FIG. 11 shows a configuration of an electric vehicle according to the prior art. In FIG. 11, the electric vehicle includes a battery assembly 1 constituted by a plurality of secondary batteries, a first contactor 2 whose one end is connected to a high-voltage side of the battery assembly 1, a second contactor 3 whose one end is connected to a low-voltage side of the battery assembly 1, a current detector 4 provided in a line on the low-voltage side of the battery assembly 1, a controller 115 connected to the battery assembly 1, the first contactor 2, the second contactor 3 and the current detector 4, a smoothing capacitor 6 connecting another end of the first contactor 2 and another end of the second contactor 3, an inverter 7 connected to both ends of the capacitor 6, and a motor 8 connected to the inverter 7.

The contactors 2 and 3 respectively include a moving contact and a fixed contact, and further include a contactor coil for operation the moving contact. One ends of the respective contactor coils are grounded, while another ends thereof are connected to the controller 115. The respective contactor coils are supplied with the auxiliary power-supply voltage of the auxiliary battery not shown from an auxiliary power-supply voltage input terminal (hereinafter, referred to as "a Vsub terminal") via the controller 115 to move the moving contacts and switch over between conductive state and non-conductive state of the contacts.

The inverter 7 includes, for example, a plurality of transistors and diodes. The inverter 7 converts a DC power-supply into an AC power-supply and sequentially applies the power-supply voltage supplied from the battery assembly 1 to each phase of the motor 8 so that the motor 8 is rotated.

The smoothing capacitor 6 is provided to reduce a change of the voltage applied to the inverter 7 and stably supply a voltage.

The current detector 4 detects a current flowing in the conductive line on the low-voltage side of the battery assembly 1 and outputs results of the detection to the controller 115.

The controller 115 inputs the current value detected by the current detector 4 and the voltage value of the battery assembly 1. The controller 115 further inputs an operation signal for operating the vehicle from an accelerator, a brake, a shift lever and the like not shown, and controls the contactors 2 and 3 in accordance with the operation signal. The contactors 2 and 3 are controlled in such a manner that the auxiliary power-supply voltage of the auxiliary battery not shown that is inputted from the Vsub terminal is applied to each contactor coil of the contactors 2 and 3 so that the contactors are switched over between conductive state and non-conductive state of the contacts.

The controller 115 compulsorily stops the application of the voltage to the contactor coil when the auxiliary power-supply voltage applied to the contactors 2 and 3 is higher than an uninterruptedly applicable voltage defined by the ratings of the contactor coil to set the contactors in non-conductive state.

Referring to FIG. 12, an operation of the controller 115 is described. FIG. 12 is a timing chart illustrating a change (a) of the voltage applied to the coil and a change (b) of the operation of the second contactor 3. In the example shown in FIG. 12, the uninterruptedly applicable voltage of the contactor coil is set to 16V.

As shown in FIG. 12($a$), the voltage applied to the coil exceeds 16V, which is the uninterruptedly applicable voltage of the contactor coils, during a time interval from a timing T2 to a timing T3, a time interval from a timing T4 to a timing T5 and a time interval after a timing T6. Therefore, as shown in FIG. 12($b$), the controller 115 switches the contactor to be in non-conductive state (OPEN) during the time interval from the timing T2 to the timing T3, the time interval from the timing T4 to the timing T5 and the time interval after the timing T6.

As described above, the contactor control apparatus according to the prior art is capable of preventing the damage of the contactor by reducing the excessive heat generation in the contactor coil.

However, in the contactor control apparatus according to the prior art, the contactors cannot be conducted when an auxiliary battery whose rated voltage is any higher than the uninterruptedly applicable voltage of the contactor coils is connected as a replacement for emergency or for maintenance, which disadvantageously stops the operation of the electric vehicle.

Further, even when an auxiliary battery having a suitable rated voltage is connected, the electric vehicle is unfavorably often stopped when the voltage value is often increased due to the change of the output voltage of the auxiliary battery.

SUMMARY OF THE INVENTION

A contactor control apparatus and a contactor control method for an electric vehicle, a program and a computer readable recording medium according to the present invention are provided in order to solve the above problems. An essential main object of the present invention is to provide a contactor control apparatus, a contactor control method, a program and a computer readable recording medium capable of flexibly and safely controlling the contactors in such a manner that the contactors remain conducted until a voltage-applicable time limit passes when the voltage applied to the coils is higher than the uninterruptedly applicable voltage of the contactor coils and are compulsorily set in non-conductive state when the voltage-applicable limit time has passed.

In order to solve the above-mentioned problems, the present invention has configurations described below.

According to the first aspect of the present invention, there is provided a contactor control apparatus comprising a controller for turning on and off a first contactor connected to one end of a battery assembly including at least one secondary battery connected in series, and a second contactor connected to another end of the battery assembly, wherein the controller counts a first counter value when a control voltage for controlling each contactor is higher than a first reference voltage, and holds the first counter value when the control voltage is lower than or equal to the first reference voltage, and wherein the controller turns off at least one of the first contactor and the second contactor when the first counter value is equal to or larger than a first threshold value.

According to the second aspect of the present invention, in the first aspect of the present invention, the controller counts a second counter value when the control voltage is lower than or equal to a first reset voltage lower than or equal to the first reference voltage, and resets the second counter value when the control voltage is higher than the first reset voltage, and wherein the controller resets the first counter value when the second counter value is equal to or larger than a second threshold value.

According to the third aspect of the present invention, in the second aspect of the present invention, the controller counts a third counter value when the control voltage is lower than or equal to a second reset value lower than or equal to a second reference voltage that is different from the first reference voltage, and resets the third counter value when the control voltage is higher than the second reset voltage, wherein the controller counts a fourth counter value when the control voltage is higher than the second reference voltage, and holds the fourth counter value when the control voltage is lower than or equal to the second reference value, wherein the controller resets the fourth counter value when the third counter value is equal to or larger than a third threshold value, and wherein the controller further turns off at least one of the first contactor and the second contactor when the fourth counter value is equal to or larger than a fourth threshold value.

According to the fourth aspect of the present invention, there is provided a contactor control method for use in a contactor control apparatus, the method including a control step of turning on and off a first contactor connected to one end of a battery assembly comprising at least one secondary battery connected in series, and a second contactor connected to another end of the battery assembly, wherein the control step includes the following steps of: counting a first counter value when a control voltage for controlling each contactor is higher than a first reference voltage, holding the first counter value when the control voltage is lower than or equal to the first reference voltage, and turning off at least one of the first contactor and the second contactor when the first counter value is equal to or larger than a first threshold value.

According to the fifth aspect of the present invention, a contactor control method according to the fourth aspect of the present invention further including the following steps of: counting a second counter value when the control voltage is lower than or equal to a first reset voltage lower than or equal to the first reference voltage, resetting the second counter value when the control voltage is higher than the first reset voltage, and resetting the first counter value when the second counter value is equal to or larger than a second threshold value.

According to the sixth aspect of the present invention, a contactor control method according to the fifth aspect of the present invention further including the following steps of: counting a third counter value when the control voltage is lower than or equal to a second reset value lower than or equal to a second reference voltage that is different from the first reference voltage, resetting the third counter value when the control voltage is higher than the second reset voltage, counting a fourth counter value when the control voltage is higher than the second reference voltage, holding the fourth counter value when the control voltage is lower than or equal to the second reference value, resetting the fourth counter value when the third counter value is equal to or larger than a third threshold value, and turning off at least one of the first contactor and the second contactor when the fourth counter value is equal to or larger than a fourth threshold value.

According to the seventh aspect of the present invention, there is provided a program including the above contactor control method.

According to the eighth aspect of the present invention, there is provided a computer readable recording medium storing the above program.

According to the contactor control apparatus and contactor control method for the electric vehicle, program and computer readable recording medium of the present invention, the contactor control apparatus capable of flexibly and safely controlling the contactors in such a manner that the contactors remain conducted until the voltage-applicable time limit passes when the voltage applied to the coils is higher than the uninterruptedly applicable voltage of the contactor coils and are compulsorily set in non-conductive state when the voltage-applicable time limit has passed can be effectively realized.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the figures are schematic representations for purposes of illustration and do not necessarily depict the actual relative sizes or locations of the elements shown.

DETAILED DESCRIPTION OF THE PREFERRED EMBODIMENTS

Preferred embodiments specifically exemplifying the best mode for carrying out the present invention will be described below referring to the accompanying drawings.

First Preferred Embodiment

Figure 1:
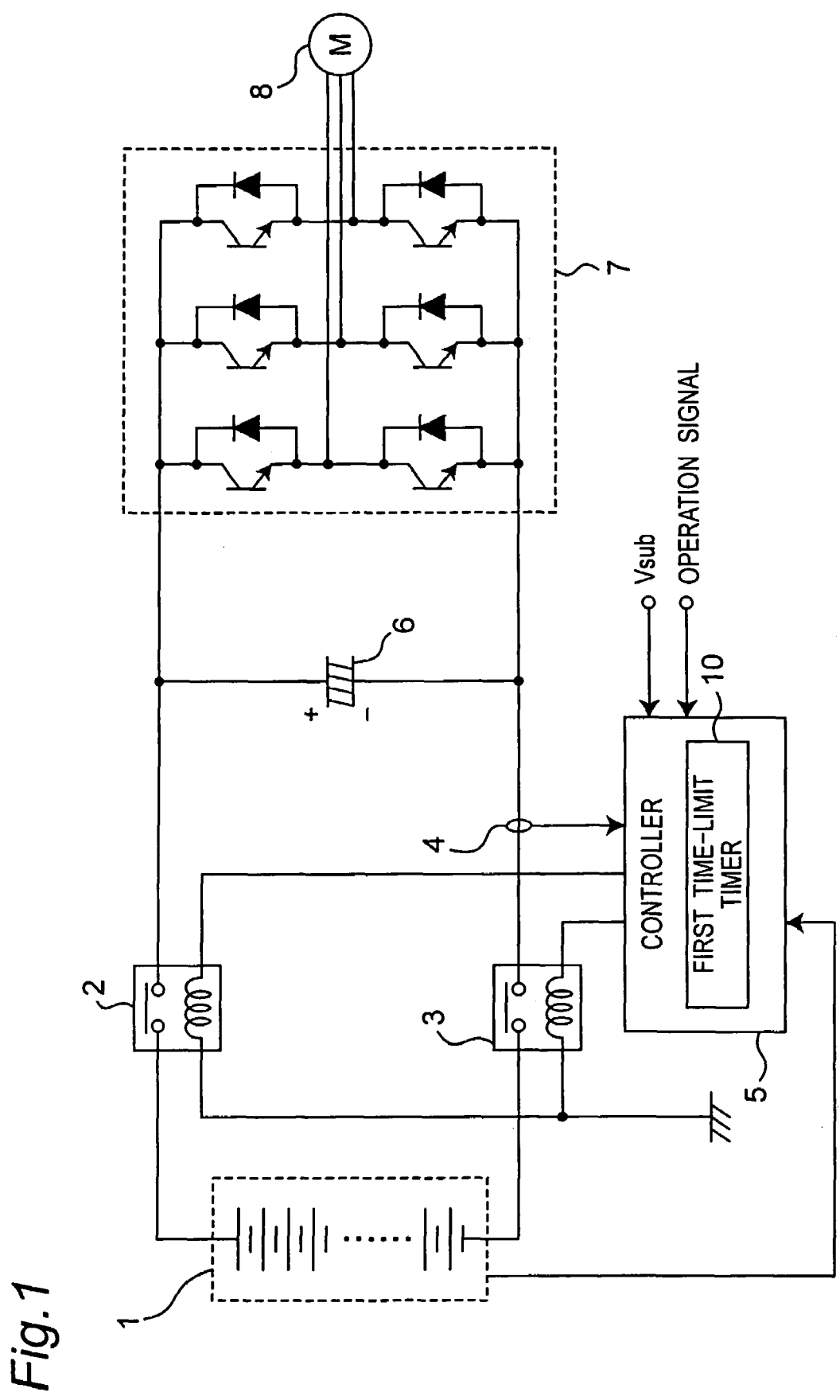
FIG. 1 is a block diagram illustrating a configuration of a contactor control apparatus for an electric vehicle according to a first preferred embodiment of the present invention.
Figure 2:
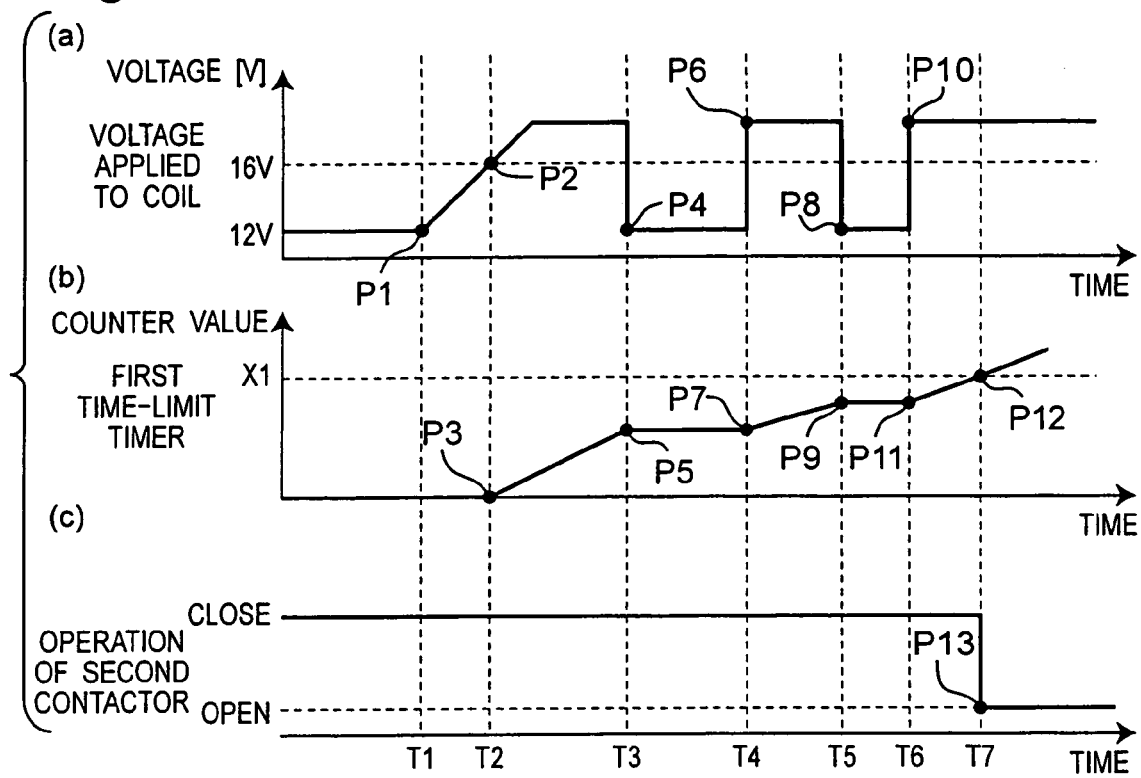
FIG. 2 is a timing chart illustrating a change (a) of a voltage applied to a coil, a change (b) of a counter of a first time-limit timer, and a change (c) of an operation of a contactor according to the first preferred embodiment of the present invention.
Figure 3:
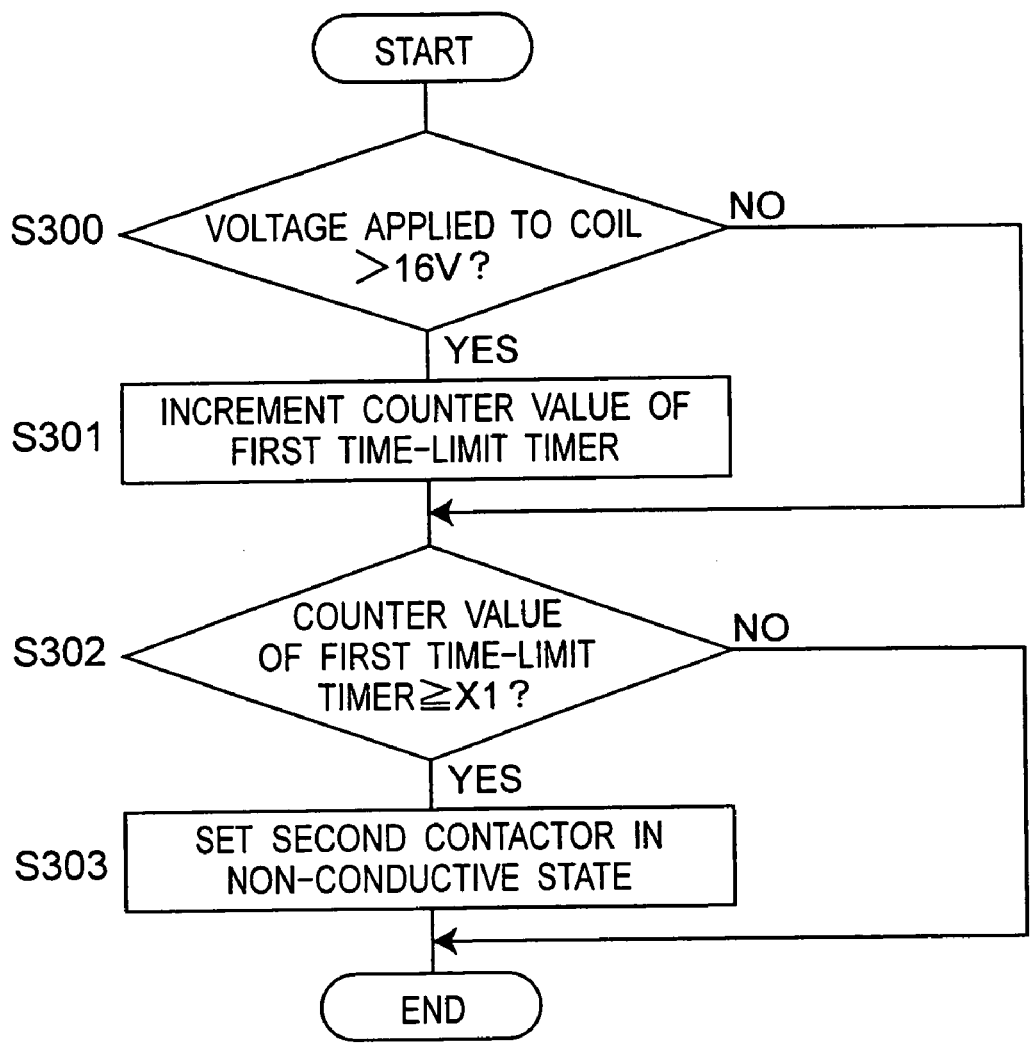
FIG. 3 is a flow chart illustrating an operation of the contactor control apparatus according to the first preferred embodiment of the present invention.

Referring to FIGS. 1 to 3, a contactor control apparatus and a contactor control method for an electric vehicle according to a first preferred embodiment of the present invention are described. FIG. 1 is a block diagram illustrating a configuration of a contactor control apparatus for the electric vehicle according to the first preferred embodiment.

Referring to FIG. 1, the electric vehicle includes a battery assembly 1 constituted by a plurality of secondary batteries, a first contactor 2 whose one end is connected to a high-voltage side of the battery assembly 1, a second contactor 3 whose one end is connected to a low-voltage side of the battery assembly 1, a current detector 4 provided in a line on the low-voltage side of the battery assembly 1, a controller 5 connected to the battery assembly 1, the first contactor 2, the second contactor 3 and the current detector 4, a smoothing capacitor 6 connecting another end of the first contactor 2 and another end of the second contactor 3, an inverter 7 connected to both ends of the capacitor 6, and a motor 8 connected to the inverter 7.

The battery assembly 1 is a power supply having a total voltage of 300V constituted by a plurality of secondary batteries (for example, 250 nickel-hydrogen batteries or the like), each having a rated voltage of 1.2V, connected in series.

The contactors 2 and 3 respectively include a moving contact and a fixed contact, and further, a contactor coil for operating the moving contact. One ends of the respective contactor coils are grounded, while another ends thereof are connected to the controller 5. The contactor coils are respectively supplied with an auxiliary power-supply voltage of an auxiliary battery not shown from an auxiliary power-supply voltage input terminal (hereinafter, referred to as "a Vsub terminal") via the controller 5 and move the moving contacts and switch over between conductive state and non-conductive state of the contacts.

The respective contactor coils of the contactors 2 and 3 have the rated voltage of 12V, and can be uninterruptedly applied a voltage thereto as long as the voltage applied to the contactor coils (hereinafter, referred to as "a voltage applied to the coils") is lower than or equal to 16V. However, when the voltage applied to the coils is higher than 16V, a first voltage-applicable time limit is set to 10 minutes. When any voltage higher than 16V is applied to the contactor coils beyond the first time limit, the contactor coils may excessively generate heat and be damaged. In the first preferred embodiment, a first reference voltage (hereinafter, referred to as "Vref1") is set to 16V.

The inverter 7 includes, for example, a plurality of transistors and diodes. The inverter 7 converts a DC power-supply into an AC power-supply and sequentially applies the power-supply voltage supplied from the battery assembly 1 to each phase of the motor 8 so that the motor 8 is rotated.

The smoothing capacitor 6 is provided to reduce a change of the voltage applied to the inverter 7 and stably supply a voltage.

The current detector 4 detects a current flowing in the conductive line on the low-voltage side of the battery assembly 1 and outputs results of the detection to the controller 5.

The controller 5 includes a first time-limit timer 10. The controller 5 inputs a value of the current detected by the current detector 4 and a value of the voltage of the battery assembly 1. Further, the controller 5 inputs an operation signal for operating the vehicle from an accelerator, a shift lever, a brake and the like not shown, and controls the contactors 2 and 3 in accordance with the inputted signal. The contactors 2 and 3 are controlled in such a manner that the auxiliary power-supply voltage of the auxiliary battery not shown, which is inputted from the Vsub terminal, is applied to each contactor coil of the contactors 2 and 3 so that the contactors are switched over between conductive state and non-conductive state of the contacts.

The controller 5 measures the voltage applied to the coils of the contactors 2 and 3, and increments a counter value of the first time-limit timer 10 when the voltage applied to the coils exceeds Vref1. When the voltage applied to the coils is lower than or equal to Vref1, the controller 5 does not increment the counter value of the first time-limit timer 10. The counter of the first time-limit timer 10 is cleared or reset, for example, at a predetermined timing such as a timing of activation of the power supply of the vehicle. When the counter value of the first time-limit timer 10 reaches a first predetermined counter value X1, the controller 5 compulsorily sets the second contactor 3, which is connected to the low-voltage side of the battery assembly 1, in non-conductive state to prevent the contactor coils from generating excessive heat and being damaged.

The first predetermined counter value X1 is set so that a time length required for the counter value of the first time-limit timer 10 to reach the first predetermined counter value X1 is smaller than or equal to 10 minutes (for example, 10 minutes), which is a first time limit, when the counter value of the first time-limit timer 10 is continuously incremented.

In the first preferred embodiment, a microcomputer constitutes the controller 5, and the controls of the first contactor 2 and second contactor 3 and the function of the first time-limit timer 10 are executed by a program stored in a computer readable recording medium.

Referring to FIGS. 2 and 3, the contactor control method in the contactor control apparatus for the electric vehicle according to the first preferred embodiment configured as described above is described. FIG. 2(a) shows a change of the voltage applied to the coils, FIG. 2(b) shows a change of the counter value of the first time-limit timer 10, and FIG. 2(c) shows a change of the operation of the second contactor 3.

The voltage applied to the coils starts to increase at a timing T1 (as indicated by a point P1), and exceeds Vref1 (16V) at a timing T2 (as indicated by a point P2). At this timing, the controller 5 starts to increment the counter value of the first time-limit timer 10 (as indicated by a point P3).

At a timing T3, the voltage applied to the coils sharply drops due to various factors, such as the exchange of the auxiliary battery, and falls below Vref1 (16V) (as indicated by a point P4). At this timing, the controller 5 stops to increment the counter value of the first time-limit timer 10 (as indicated by a point P5).

At a timing T4, the voltage applied to the coils increases again, and exceeds Vref1 (16V) (as indicated by a point P6). At this timing, the controller 5 restarts to increment the counter value of the first time-limit timer 10 (as indicated by a point P7).

At a timing T5, the voltage applied to the coils falls below Vref1 (16V) (as indicated by a point P8), and the controller 5 accordingly stops to increment the counter value of the first time-limit timer 10 (as indicated by a point P9). Thereafter, the voltage applied to the coils exceeds Vref1 (16V) again at a timing T6 (as indicated by a point P10), and the controller 5 accordingly restarts to increment the counter value of the first time-limit timer 10 (as indicated by a point P11).

At a timing T7, the counter value of the first time-limit timer 10 reaches the predetermined counter value X1 (as indicated by a point P12). The controller 5 then compulsorily sets the second contactor 3 in non-conductive state (open) (as indicated by a point P13).

Temperatures of the contactor coils gradually increase every time when the voltage applied to the coils exceeds Vref1 (16V). However, the contactor is set in non-conductive state when the counter value of the first time-limit timer 10 reaches the predetermined counter value X1. Therefore, the contactors are prevented from being damaged because the excessive heat generation is thus prevented.

FIG. 3 is a flow chart illustrating an operation of the contactor control apparatus according to the first preferred embodiment. First of all, it is checked whether or not the voltage applied to the coils is higher than Vref1 (16V) (at step S300). When the voltage applied to the coils is higher than Vref1 (16V), the counter value of the first time-limit timer 10 is incremented (at step S301), and the control flow proceeds to S302 when the voltage applied to the coils is lower than or equal to Vref1 (16V).

Next, it is checked whether or not the counter value of the first time-limit timer 10 is at least the first predetermined counter value X1 (at step S302). When the counter value of the first time-limit timer 10 is at least the first predetermined counter value X1, the second contactor 3 is compulsorily set in non-conductive state (at step S303). When the counter value of the first time-limit timer 10 is smaller than the first predetermined counter value X1, no action is taken.

The controller 5 repeats the above steps S300 to S303 per a predetermined time (for example, 100 msec) to monitor the change of the voltage applied to the coils and prevent the excessive heat generation in the contactor coils.

According to the contactor control apparatus and the contactor control method for the electric vehicle of the first preferred embodiment, the first time-limit timer for incrementing the counter value thereof when the voltage applied to the coils is higher than Vref1 is provided. When the counter value of the first time-limit timer reaches the predetermined counter value, the contactor is compulsorily set in non-conductive state. This leads to that the excessive heat generation in the contactor coils can be prevented, and the stop of the vehicle can be reduced when the voltage applied to the coils is often increased.

The first time-limit timer 10 increments or decrements the counter starting from an initial value by a certain value per a certain time interval to count the time when the voltage applied to the coils is higher than the reference voltage Vref1. The first time-limit timer 10 does not count when the voltage applied to the coils is lower than or equal to the reference voltage Vref1. When the counter value of the first time-limit timer 10 reaches the first predetermined counter value, it is determined that the temperatures of the contactor coils have exceeded a normal range. At this timing, the controller 5 compulsorily sets at least one of the contactors 2 and 3 in non-conductive state to disconnect a voltage supply path from the battery assembly 1 to a load of the vehicle so that the vehicle is stopped. The first predetermined counter value is different depending on the ratings of the contactor coils. However, the first predetermined counter value is preferably set a time length such that the excessive heat generation can be substantially avoided in the contactor coils. According to the present invention, even when the change of the voltage of the auxiliary battery frequently occurs and the voltage applied to the coils exceeds the first reference voltage Vref1, the contactor is not set in non-conductive state until the counter value of the first time-limit timer 10 reaches the first predetermined counter value, and as a result, the number of stop of the vehicle is reduced. When the counter value of the first time-limit timer 10 reaches the first predetermined counter value, at least one of the contactors 2 and 3 is compulsorily set in non-conductive state, which prevents the excessive heat generation in the contactor coils.

Second Preferred Embodiment

Figure 4:
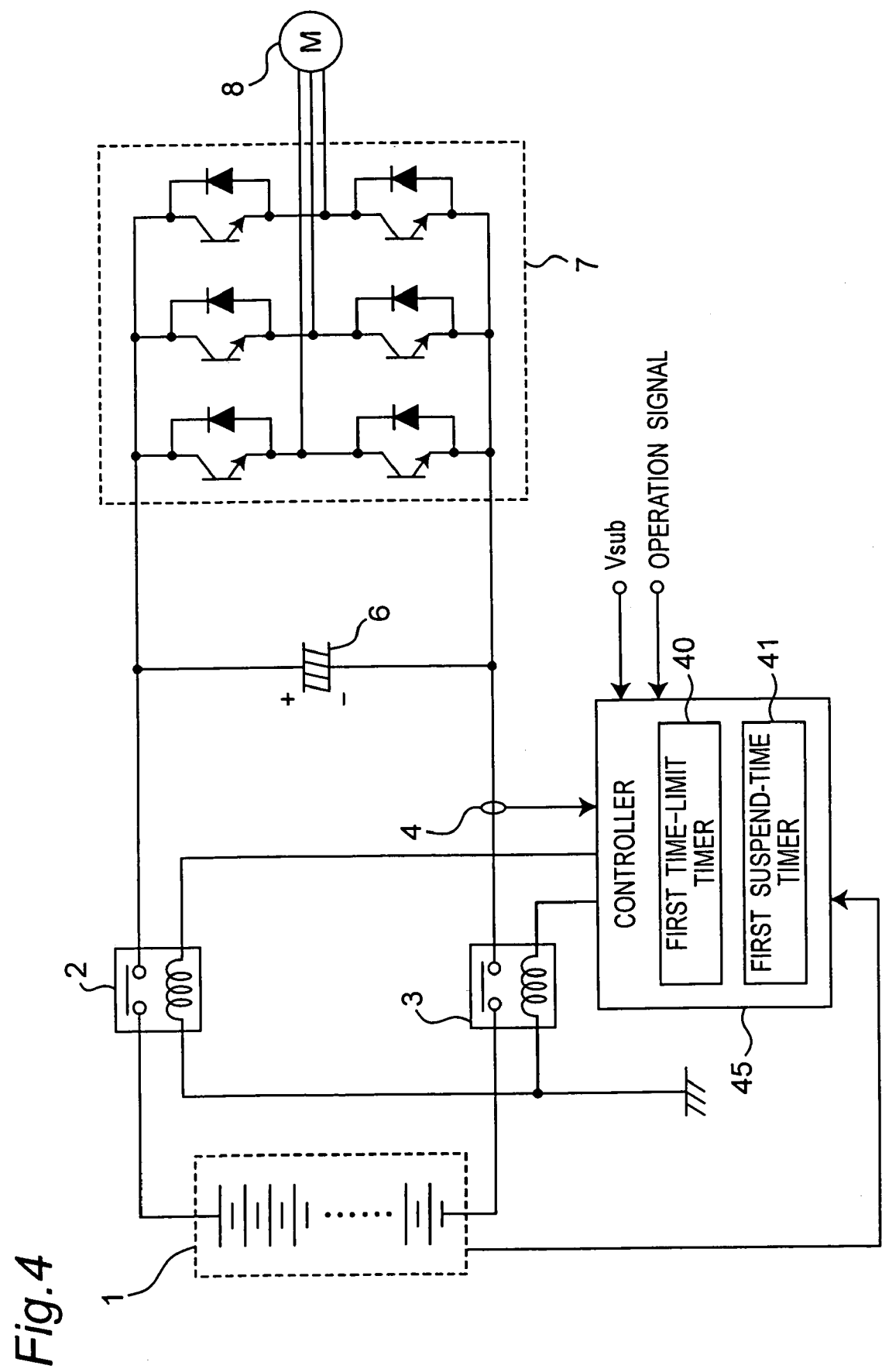
FIG. 4 is a block diagram illustrating a configuration of a contactor control apparatus for an electric vehicle according to a second preferred embodiment of the present invention.
Figure 5:
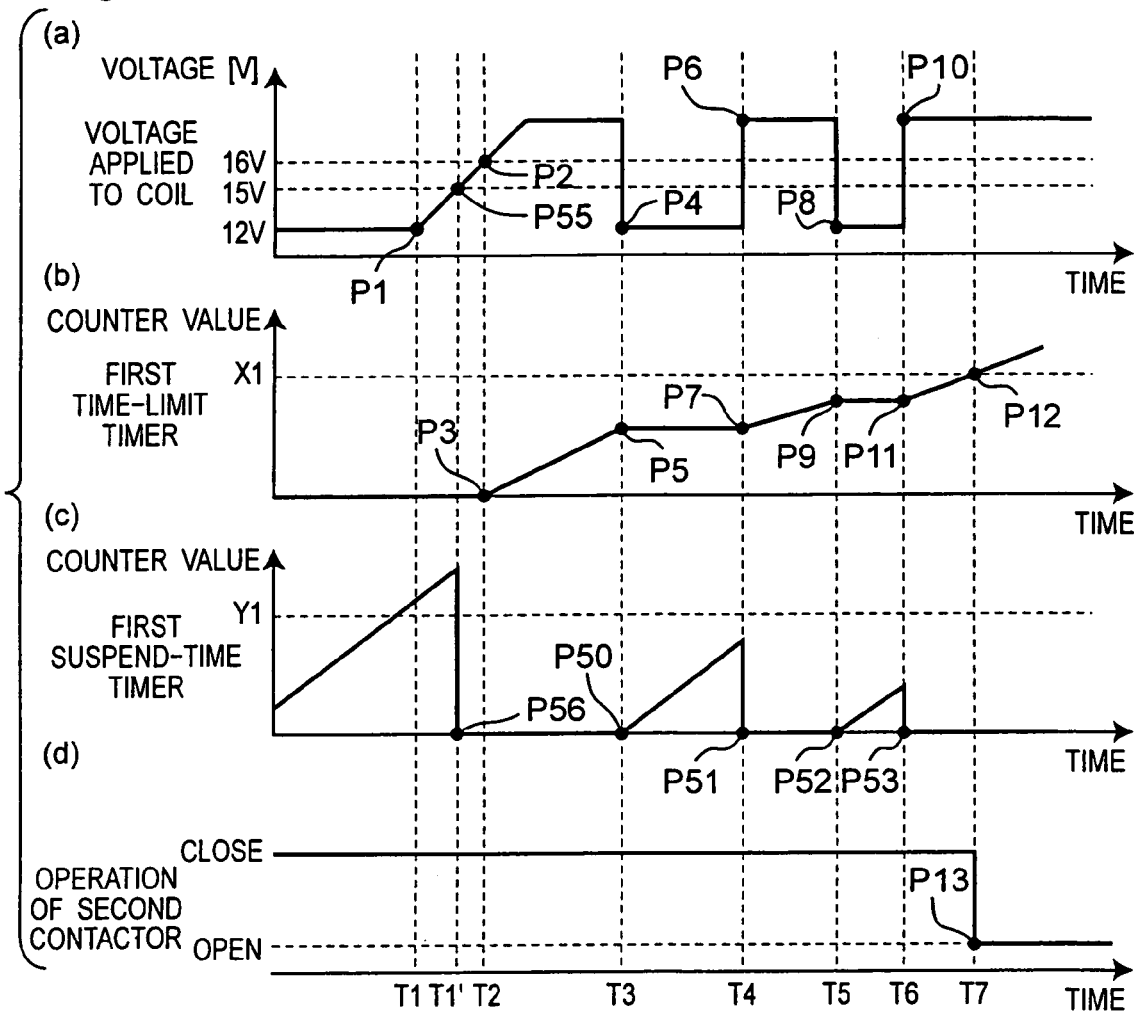
FIG. 5 is a timing chart illustrating a change (a) of a voltage applied to a coil, a change (b) of a counter of a first time-limit timer, a change (c) of a counter of a first suspended-time timer, and a change (d) of an operation of a contactor according to the second preferred embodiment of the present invention.
Figure 6:
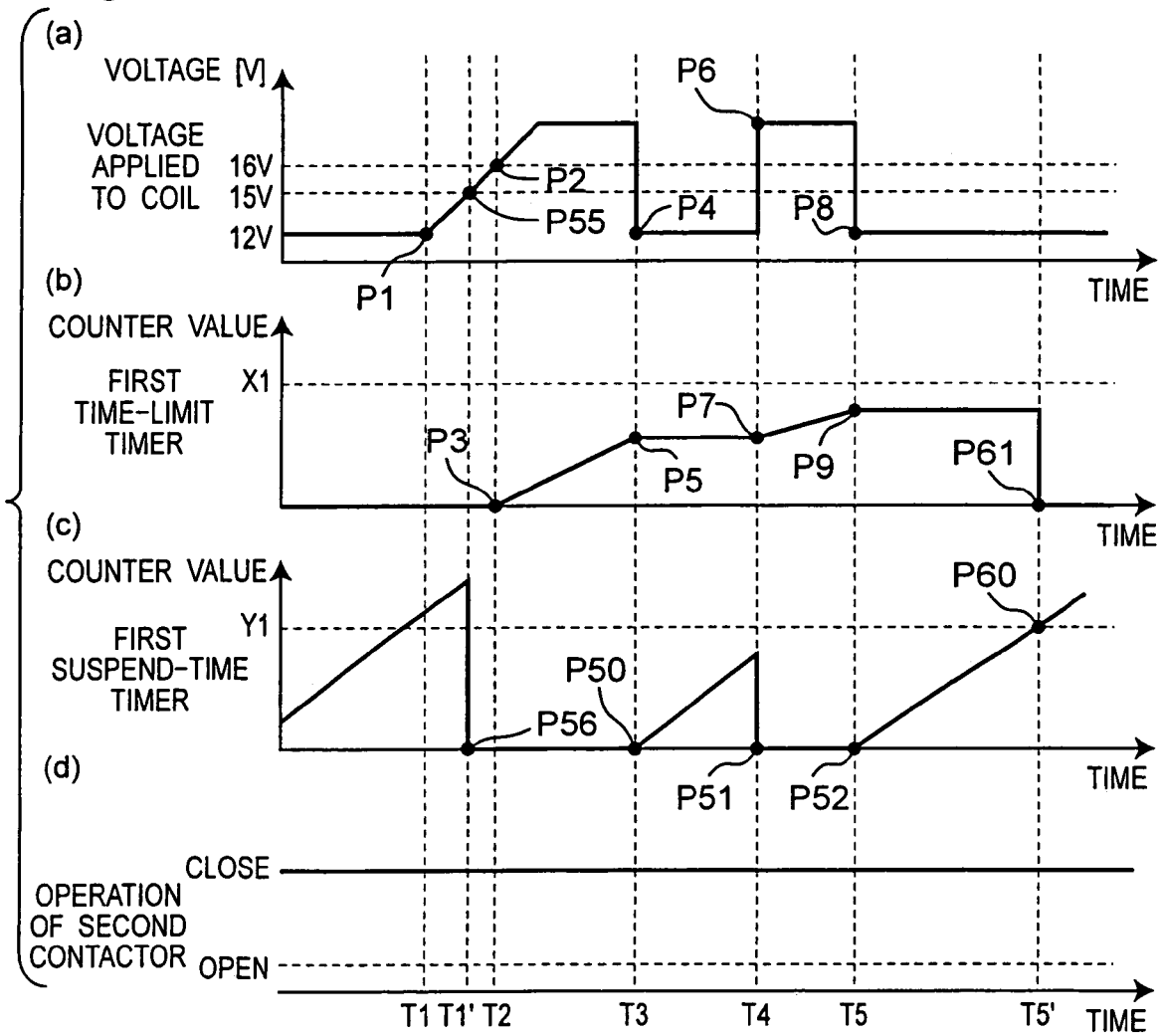
FIG. 6 is a timing chart illustrating another change (a) of a voltage applied to a coil, a change (b) of a counter of a first time-limit timer relative to the change (a), a change (c) of a counter of a first suspended-time timer, and a change (d) of an operation of a contactor according to the second preferred embodiment of the present invention.

Referring to FIGS. 4 to 6, a contactor control apparatus and a contactor control method for an electric vehicle according to a second preferred embodiment of the present invention are described. FIG. 4 is a block diagram illustrating a configuration of a contactor control apparatus for the electric vehicle according to the second preferred embodiment. The electric vehicle according to the second preferred embodiment is different from the first preferred embodiment in that a controller 45 is provided instead of the controller 5. In other respects, the configuration is similar to that of the first preferred embodiment, components similar or equivalent to those of the first preferred embodiment are designated by the same numeral references, and their descriptions are omitted.

The controller 45 includes a first time-limit timer 40 and a first suspend-time timer 41. The controller 45 inputs the current value detected by the current detector 4 and the voltage value of the battery assembly 1. Further, the controller 45 inputs an operation signal for operating the vehicle from an accelerator, a shift lever, and the like not shown, and controls the contactors 2 and 3 in accordance with the operation signal. The contactors 2 and 3 are controlled in such a manner that the auxiliary power-supply voltage of the auxiliary battery not shown, which is inputted from the Vsub terminal, is applied to each contactor coil of the contactors 2 and 3 so that the contactors switch over between conductive state and non-conductive state of the contacts.

The controller 45 measures the voltage applied to the coils of the contactors 2 and 3, and increments a counter value of the first time-limit timer 40 when the voltage applied to the coils is higher than Vref1 (16V). The controller 45 does not increment the counter value of the first time-limit timer 40 when the voltage applied to the coils is lower than or equal to Vref 1. When the voltage applied to the coils is higher than a first suspend-time timer counter clear voltage (hereinafter, referred to as "Vclr"), the counter value of the first suspend-time timer 41 is cleared or reset. When the voltage applied to the coils is lower than or equal to Vclr, the counter value of the first suspend-time timer 41 is incremented. When the counter value of the first suspend-time timer 41 reaches a second predetermined counter value Y1, the counter value of the first time-limit timer 40 is cleared or reset. When the counter value of the first time-limit timer 40 reaches the first predetermined counter value X1, the controller 45 compulsorily sets the second contactor 3, which is connected to the low-voltage side of the battery assembly 1, in non-conductive state so that the contactors are prevented from any damage due to the excessive heat generation in the contactor coils. The value of Vclr may be set to an arbitrary value lower than or equal to Vref1, and is preferably set to a value slightly lower than Vref1. In the second preferred embodiment, Vclr is set to 15V.

The first predetermined counter value X1 is set so that a time length required for the counter value of the first time-limit timer 40 to reach the first predetermined counter value X1 is smaller than or equal to 10 minutes (for example, 10 minutes), which is the first time limit, when the counter value of the first time-limit timer 40 is continuously incremented. The second predetermined counter value Y1 is set so that a time length required for the counter value of the first suspend-time timer 41 to reach the second predetermined counter value Y1 is a time sufficiently long enough (for example, two minutes) for the temperatures of the contactor coils to be lowered to a temperature of a safe level, when the counter value of the first suspend-time timer 41 is continuously incremented.

In the second preferred embodiment, the microcomputer constitutes the controller 45, and the controls of the contactors 2 and 3 and the functions of the first time-limit timer 40 and the first suspend-time timer 41 are executed by a program stored in a computer readable recording medium.

Figure 7:
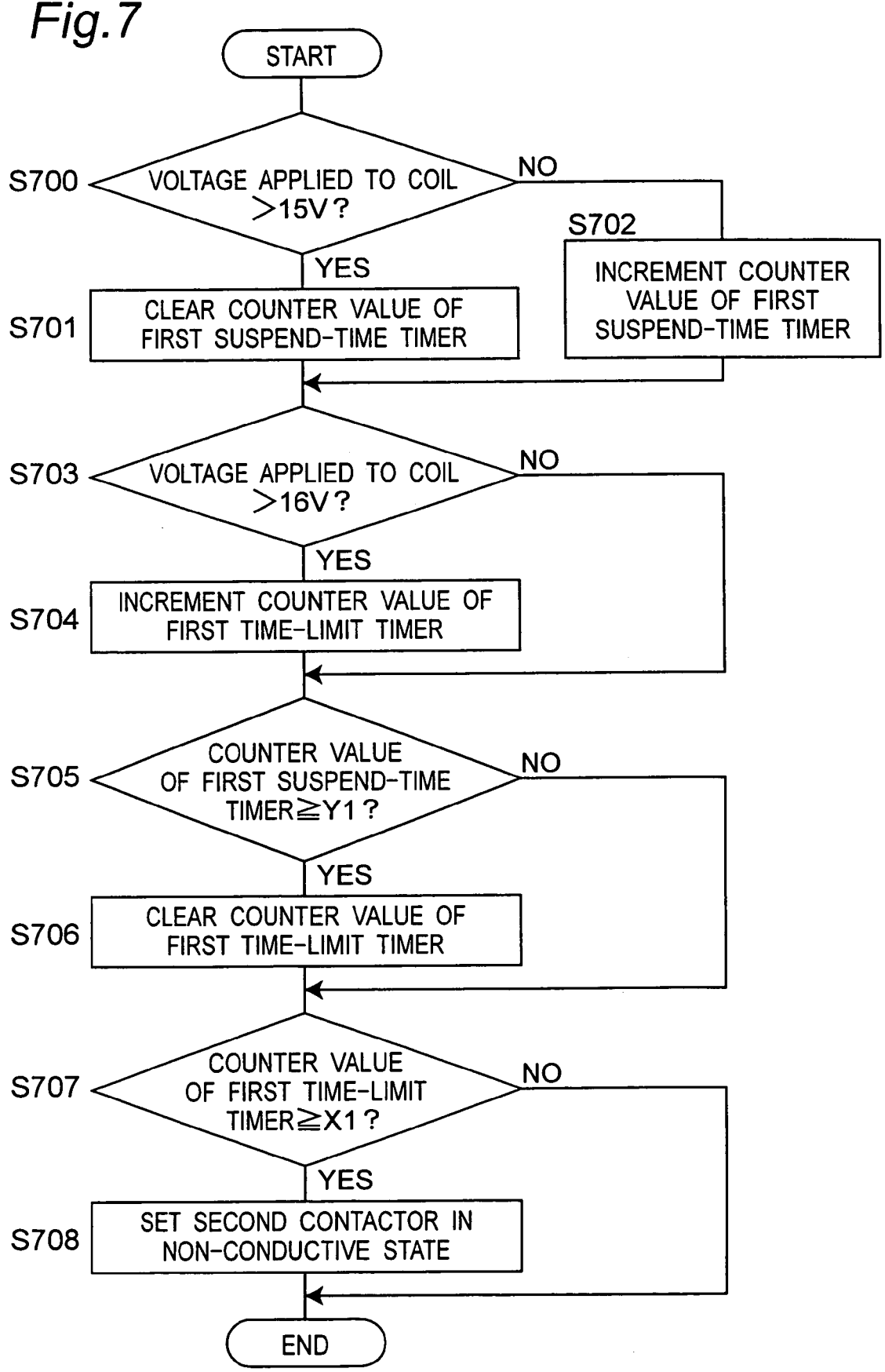
FIG. 7 is a flow chart illustrating an operation of the contactor control apparatus according to the second preferred embodiment of the present invention.

Referring to FIGS. 5 to 7, the contactor control method in the contactor control apparatus for the electric vehicle according to the second preferred embodiment constituted as described above. First of all, referring to FIG. 5, a case where the counter value of the first time-limit timer 40 is not cleared by the first suspend-time timer 41 is described. FIG. 5(*a*) shows a change of the voltage applied to the coils, FIG. 5(*b*) shows a change of the counter value of the first time-limit timer 40, FIG. 5(*c*) shows a change of the first suspend-time timer 41 and FIG. 5(*d*) shows a change of the operation of the second contactor 3.

The voltage applied to the coils starts to increase at a timing T1 (as indicated by a point P1), and exceeds Vclr (15V) at a timing T1' (as indicated by a point P55). At this timing, the controller 45 clears or resets the counter value of the first suspend-time timer 41 (as indicated by a point P56).

At a timing T2, the voltage applied to the coils exceeds Vref1 (16V) (as indicated by a point P2). At this timing, the controller 45 starts to increment the counter value of the first time-limit timer 40 (as indicated by a point P3).

At a timing T3, the voltage applied to the coils sharply drops due to various factors, such as the exchange of the auxiliary battery, and falls below Vref1 (16V) and Vclr (15V) (as indicated by a point P4). At this timing, the controller 45 temporarily stops the counter value of the first time-limit timer 40 (as indicated by a point P5). Further, the controller 45 starts to increment the counter value of the first suspend-time timer 41 (as indicated by a point P50).

At a timing T4, the voltage applied to the coils increases again, and exceeds Vclr (15V) and Vref1 (16V) (as indicated by a point P6). At this timing, the controller 45 restarts to increment the counter value of the first time-limit timer 40 (as indicated by a point P7), and clears or resets the counter value of the first suspend-time timer 41 (as indicated by a point P51).

At a timing T5, the voltage applied to the coils falls below Vref1 (16V) and Vclr (15V) (as indicated by a point P8), and the controller 45 accordingly stops to increment the counter value of the first time-limit timer 40 (as indicated by a point P9). Further, the counter value of the first suspend-time timer 41 is incremented (as indicated by a point P52). Thereafter, the voltage applied to the coils exceeds Vclr (15V) and Vref1 (16V) again at a timing T6 (as indicated by a point P10), and the controller 5 accordingly restarts to increment the counter value of the first time-limit timer 40 (as indicated by a point P11), and clears or resets the counter value of the first suspend-time timer 41 (as indicated by a point P53).

At a timing T7, the counter value of the first time-limit timer 40 reaches the predetermined counter value X1 (as indicated by a point P12), and the controller 45 compulsorily sets the second contactor 3 in non-conductive state (OPEN) (as indicated by a point P13).

The temperatures of the contactor coils gradually increase every time when the voltage applied to the coils exceeds Vref1 (16V). However, the contactor is set in non-conductive state when the counter value of the first time-limit timer 40 reaches the first predetermined counter value X1. Therefore, the contactors are prevented from being damaged since the excessive heat generation is prevented.

Next, referring to FIG. 6 is described a case where the counter value of the first time-limit timer 40 is cleared or reset by the first suspend-time timer 41. FIG. 6(*a*) shows a change of the voltage applied to the coils, FIG. 6(*b*) shows a change of the counter value of the first time-limit timer 40, FIG. 6(*c*) shows a change of the counter value of the first suspend-time timer 41, and FIG. 6(*d*) shows a change of the operation of the second contactor 3.

During the time interval from the timing T1 to the timing T5, the voltage applied to the coils shown in FIG. 6 is the same as described in the case where the counter value of the first time-limit timer 40 is not cleared by the first suspend-time timer 41 shown in FIG. 5. Therefore, the description relating to the time interval is omitted.

After the timing T5, the voltage applied to the coils stays lower than or equal to Vclr (15V) and Vref1 (16V), and the counter value of the first suspend-time timer 41 continues to be incremented. Therefore, the counter value of the first suspend-time timer 41 reaches the second predetermined counter value Y1 at a timing T5' (as indicated by a point P60). At this timing, the controller 45 clears or resets the counter value of the first time-limit timer 40 (as indicated by a point P61).

The temperatures of the contactor coils gradually increase every time when the voltage applied to the coils exceeds Vref1 (16V). However, when the voltage applied to the coils is lower than or equal to Vclr (15V) for a long time interval, the temperatures of the contactor coils falls to the temperature of the safe level. The counter of the first time-limit timer 40 is cleared or reset when the counter value of the first suspend-time timer 41 reaches the second predetermined counter value Y1. Accordingly, when a predetermined length of time has passed with the voltage applied to the coils being sufficiently low, it is determined that the temperatures of the contactor coils are sufficiently lowered, and the contactors are kept in conductive state. As a result, the number of stop of the electric vehicle is reduced.

FIG. 7 is a flow chart for describing the contactor control method according to the second preferred embodiment. First of all, it is checked whether or not the voltage applied to the coils is higher than Vclr (15V) (at step S700). When the voltage applied to the coils is higher than Vclr (15V), the counter value of the first suspend-time timer 41 is cleared or reset (at step S701). When the voltage applied to the coils is equal to or lower than Vclr (15V), the counter value of the first suspend-time timer 41 is incremented (at step S702), and the control flow proceeds to S703.

Next, it is checked whether or not the voltage applied to the coils is higher than Vref1 (16V) (at step S703). When the voltage applied to the coils is higher than Vref1 (16V), the counter value of the first time-limit timer is incremented (at step S704). When the voltage applied to the coils is lower than or equal to Vref1 (16V), the control flow proceeds to S705.

Next, it is checked whether or not the counter value of the first suspend-time timer 41 is equal to or larger than the second predetermined counter value Y1 (at step S705). When the counter value of the first suspend-time timer 41 is equal to or larger than the second predetermined counter value Y1, the counter value of the first time-limit timer 40 is cleared or reset (at step S706). When the counter value of the first suspend-time timer 41 is smaller than the second predetermined counter value Y1 in S705, the control flow proceeds to S707.

Next, it is checked whether or not the counter value of the first time-limit timer 40 is equal to or larger than the first predetermined counter value X1 (at step S707). When the counter value of the first time-limit timer 40 is equal to or larger than the first predetermined counter value X1, the second contactor 3 is compulsorily set in non-conductive state (at step S708). When the counter value of the first time-limit timer 40 is smaller than the first predetermined counter value X1 in S707, no action is taken.

The controller 45 repeats the foregoing steps S700 to S708 per a predetermined time interval (for example, 100 msec) to monitor the change of the voltage applied to the coils and prevent the excessive heat generation in the contactor coils.

According to the contactor control apparatus and the contactor control method for the electric vehicle of the second preferred embodiment, the first time-limit timer 40 for incrementing the counter value thereof when the voltage applied to the coils is more than Vref1 and the first suspend-time timer 41 for incrementing the counter value thereof when the voltage applied to the coils is lower than or equal to Vclr are provided. The contactor is compulsorily set in non-conductive state when the counter value of the first time-limit counter reaches the first predetermined counter value, while the counter value of the first time-limit timer is cleared or reset when the counter value of the first suspend-time timer reaches the second predetermined counter value. This leads to that the excessive heat generation in the contactor coils can be prevented, and the number of stop of the vehicle can be further reduced when the voltage applied to the coils is often increased.

The first suspend-time timer 41 increments or decrements the counter starting from an initial value by a certain value per a certain time interval to count the time interval when the applied voltage from the auxiliary power supply is lower than or equal to the suspend-time timer counter clear voltage Vclr, that is, the time interval when the voltage applied to the coils is sufficiently low. An arbitrary value lower than or equal to the first reference voltage Vref1 may be set to the suspend-time timer counter clear voltage Vclr. When the counter value of the first suspend-time timer 41 reaches the second predetermined counter value, the counter value of the first time-limit timer 40 is cleared or reset based on the determination that the temperatures of the contactor coils are sufficiently lowered. The second predetermined counter value is preferably set to a time long enough for the temperatures of the contactor coils to fall to the temperature of the safe level. According to the present invention, when the counter value of the first suspend-time timer 41 reaches the second predetermined counter value, it is determined that the temperatures of the contactor coils are low enough to satisfy the safe level, and the counter value of the first time-limit timer 40 is accordingly cleared or reset. This leads to that the disconnection of the contactor coil by the first time-limit timer 40 irrespective of the temperatures of the contactor coils within the safe range can be prevented.

Third Preferred Embodiment

Figure 8:
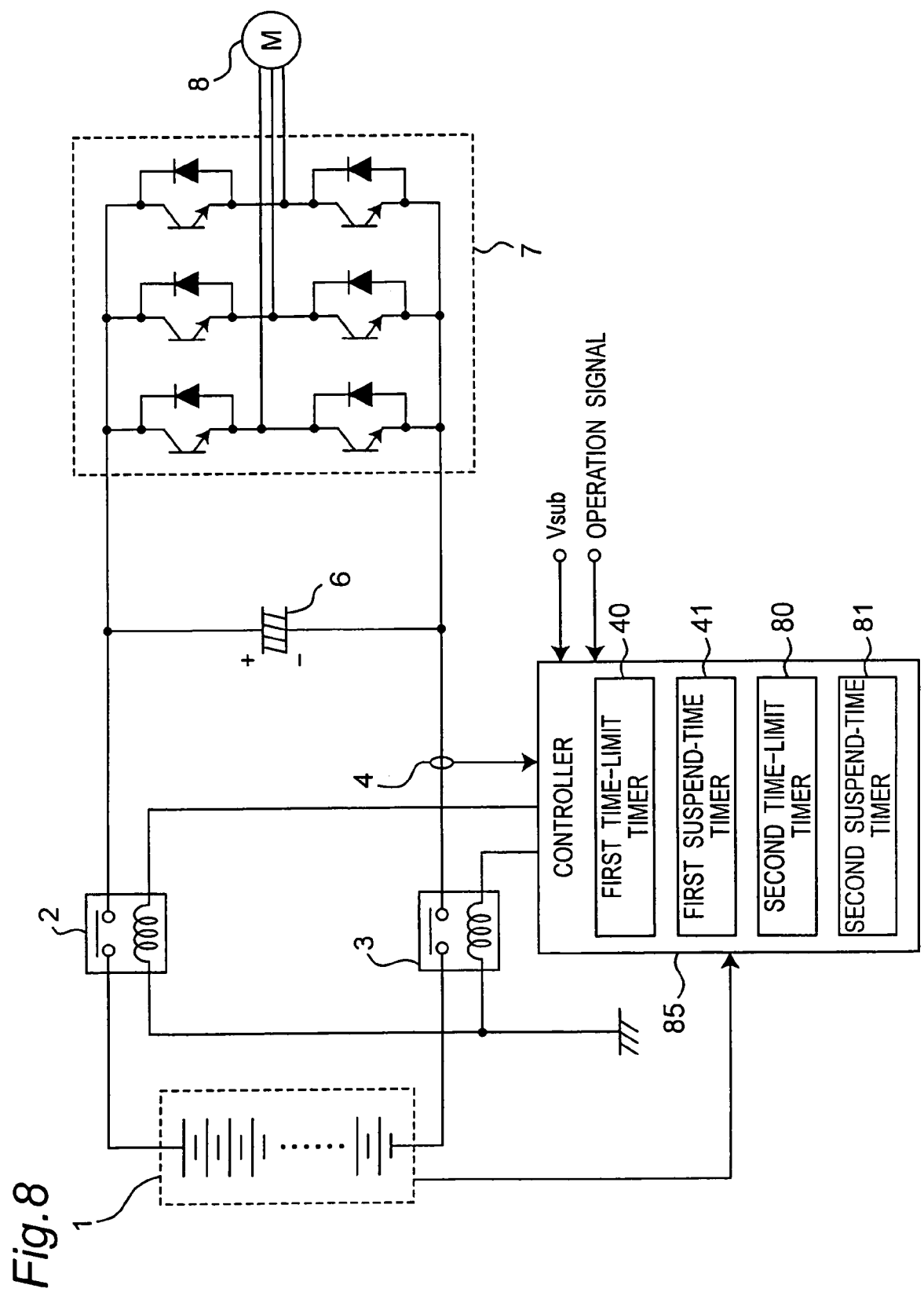
FIG. 8 is a bock diagram illustrating a configuration of a contactor control apparatus for an electric vehicle according to a third preferred embodiment of the present invention.
Figure 9:
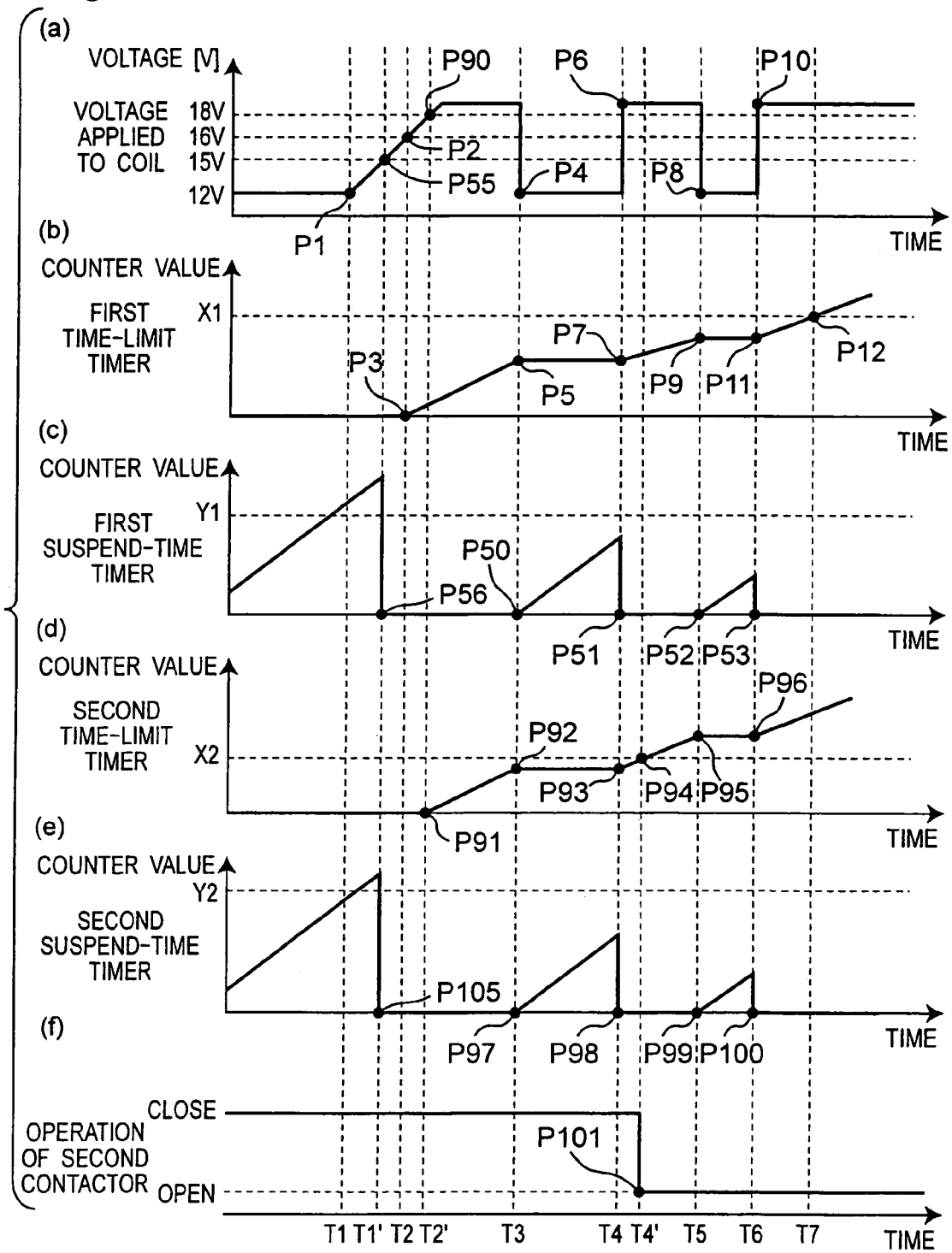
FIG. 9 is a timing chart illustrating a change (a) of a voltage applied to a coil, a change (b) of a counter of a first time-limit timer, a change (c) of a counter of a first suspend-time timer, a change (d) of a counter of a second time-limit timer, a change (e) of a counter of a second suspend-time timer, and a change (f) of an operation of a contactor according to the third preferred embodiment of the present invention.
Figure 10:
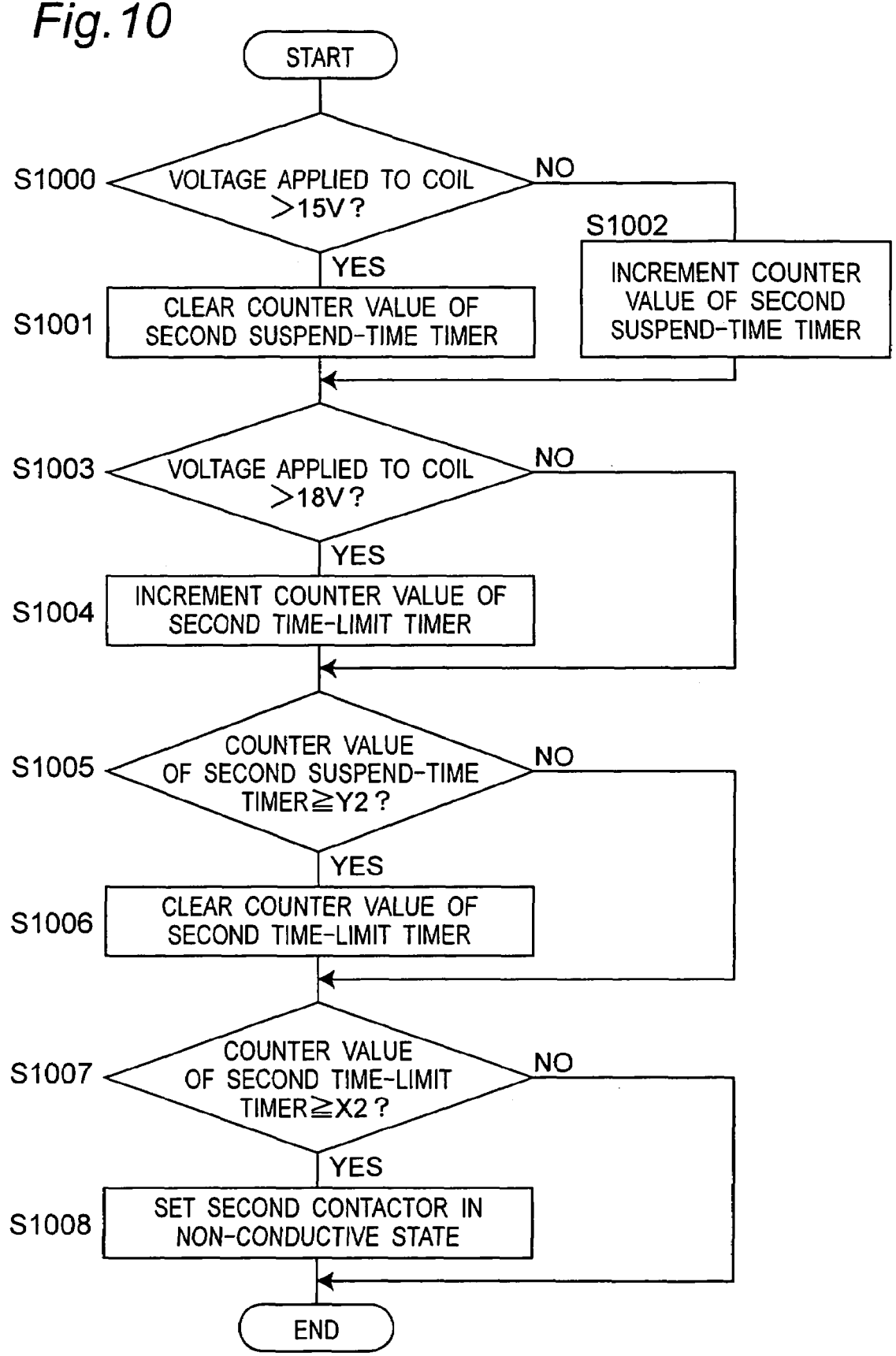
FIG. 10 is a flow chart illustrating an operation of the contactor control apparatus according to the third preferred embodiment of the present invention.
Figure 11:
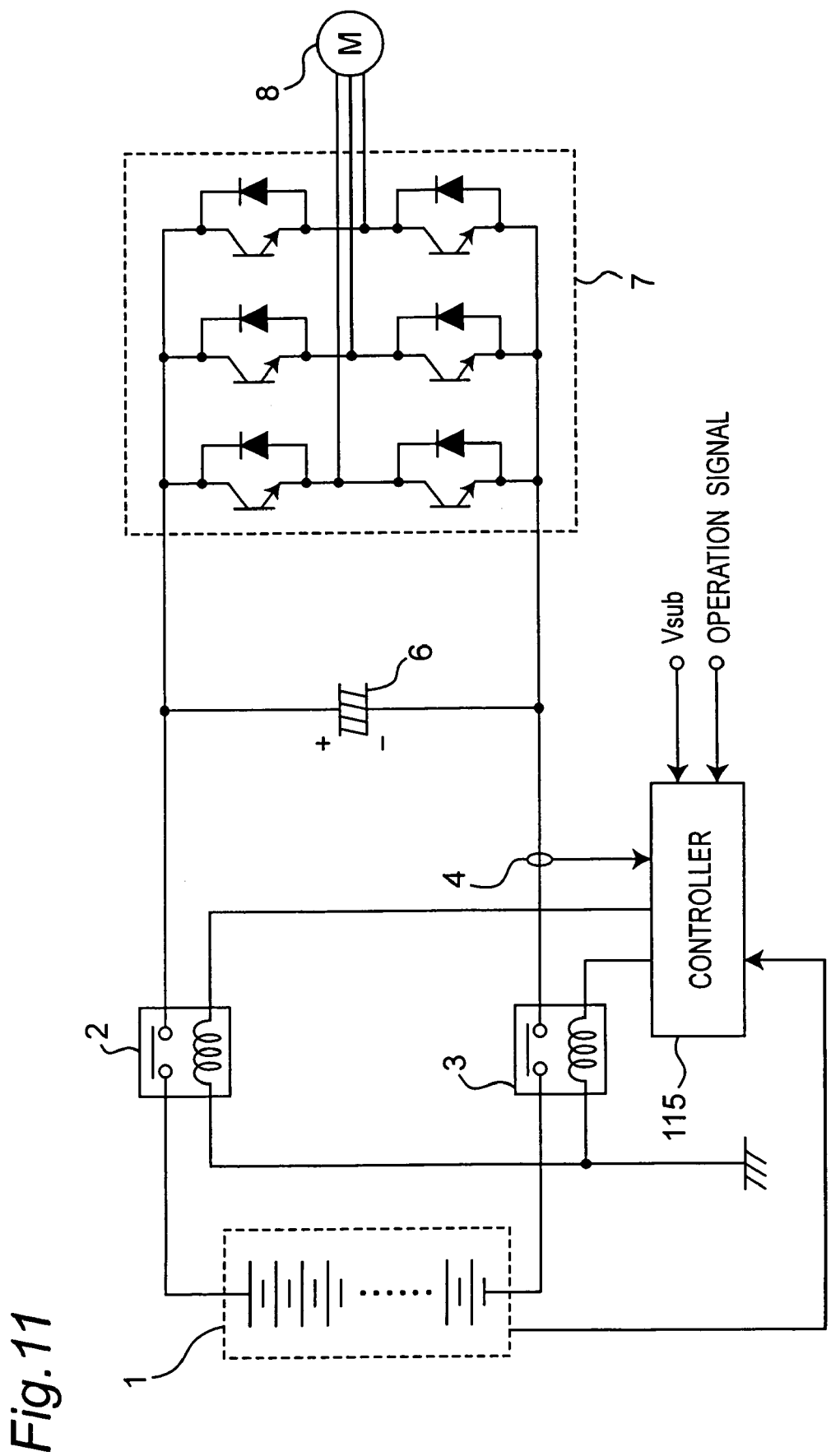
FIG. 11 is a bock diagram illustrating a configuration of the contactor control apparatus for an electric vehicle according to a prior art.
Figure 12:
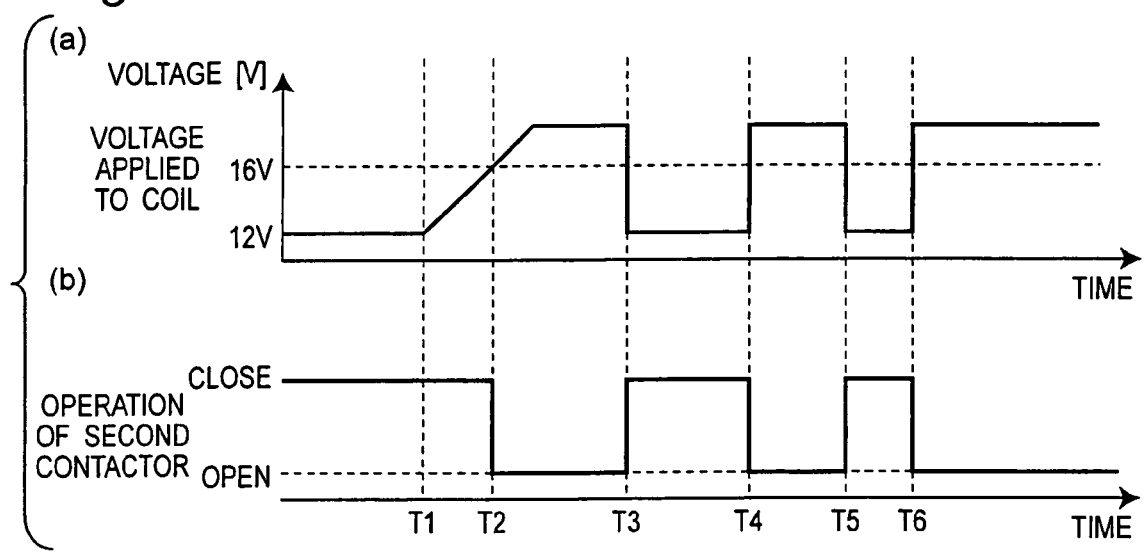
FIG. 12 is a timing chart illustrating a change (a) of a voltage applied to a coil and a change (b) of an operation of a contactor according to the prior art.

Referring to FIGS. 8 to 10, a contactor control apparatus and a contactor control method for an electric vehicle according to a third preferred embodiment of the present invention are described. FIG. 8 is a block diagram illustrating a configuration of a contactor control apparatus according to the third preferred embodiment. The electric vehicle according to the third preferred embodiment shown in FIG. 8 is different from the second preferred embodiment shown in FIG. 5 in that a controller 85 is provided instead of the controller 45. In other respects, the configuration is similar to that of the second preferred embodiment, components similar or equivalent to those of the first preferred embodiment are designated by the same numeral references, and their descriptions are omitted.

The respective contactor coils of the contactors 2 and 3 have the rated voltage of 12V, and can be uninterruptedly applied a voltage thereto as long as the voltage applied to the contactor coils (hereinafter, referred to as "a voltage applied to the coils") is lower than or equal to 16V. However, when the voltage applied to the coils is higher than 16V and lower than or equal to 18V, the first voltage-applicable time limit is set to 10 minutes. When the voltage applied to the coils is higher than 18V, the second voltage-applicable time limit is set to a minute. When the voltage higher than 16V and lower than or equal to 18V is applied to the contactor coils beyond the first time limit, or when the voltage higher than 18V is applied to the contactor coils beyond the second time limit, the contactor coils may excessively generate heat and be damaged. In the third preferred embodiment, the first reference voltage (Vref1) is set to 16V, and the second reference voltage (Vref2) is set to 18V.

A controller 85 includes a second time-limit timer 80 and a second suspend-time timer 81 in addition to a first time-limit timer 40 and a first suspend-time timer 41 according to the second preferred embodiment shown in FIG. 4. The controller 85 inputs the current value detected by the current detector 4 and the voltage value of the battery assembly 1. The controller 85 further inputs an operation signal for operating the vehicle from an accelerator, a brake, a shift lever and the like not shown, and controls the contactors 2 and 3 in accordance with the inputted signal. The contactors 2 and 3 are controlled in such a manner that the auxiliary power-supply voltage of the auxiliary battery not shown that is inputted from the Vsub terminal is applied to each contactor coil of the contactors 2 and 3 so that the contactors switch over between conductive state and non-conductive state of the contacts.

The controller 85 measures the voltage applied to the coils of the contactors 2 and 3, and increments the counter value of the first time-limit timer 40 when the voltage applied to the coils is higher than Vref1 (16V). When the voltage applied to the coils is lower than or equal to Vref1, the counter value of the first time-limit timer 40 is not incremented. When the voltage applied to the coils is higher than Vref2 (18V), the counter value of the second time-limit timer 80 is incremented. On the contrary, the counter value of the second time-limit timer 80 is not incremented when the voltage applied to the coils is lower than or equal to Vref2. The counters of the first suspend-time timer 41 and the second suspend-time timer 81 are cleared or reset when the voltage applied to the coils is higher than the suspend-time timer counter clear voltage (Vclr), and the counters of the first suspend-time timer 41 and the second suspend-time timer 81 are incremented when the voltage applied to the coils is lower than or equal to Vclr. When the counter value of the first suspend-time timer 41 reaches the second predetermined counter value Y1, the counter value of the first time-limit timer 40 is cleared or reset. When the counter value of the second suspend-time timer 81 reaches a fourth predetermined counter value Y2, the counter value of the second time-limit timer 80 is cleared or reset. In addition, although an arbitrary value lower than or equal to Vref1 and Vref2 may be set as Vclr, Vclr is preferably set to a value slightly lower than Vref1 and Vref2. In the third preferred embodiment, Vclr is set to 15V.

The controller 85 compulsorily sets the second contactor 3, which is connected to the low-voltage side of a battery assembly 1, in non-conductive state when the counter value of the first time-limit timer 40 reaches the first predetermined counter value X1 or when the counter value of the second time-limit timer 80 reaches a third predetermined counter value X2 so as to prevent the contactor coils from generating any excessive heat and being damaged.

The first predetermined counter value X1 is set so that a time length required for the counter value of the first time-limit timer 40 to reach the first predetermined counter value X1 is smaller than or equal to 10 minutes (for example, 10 minutes), which is the first time limit, when the counter value of the first time-limit timer 40 continues to be incremented. The second predetermined counter value Y1 is set so that a time length required for the counter value of the first suspend-time timer 41 to reach the second predetermined counter value Y1 is a time long enough for the temperatures of the contactor coils to be lowered to the temperature of the safe level (for example, two minutes) when the counter value of the first suspend-time timer 41 continues to be incremented.

In the same manner, the third predetermined counter value X2 is set so that a time length required for the counter value of the second time-limit timer 80 to reach the third predetermined counter value X2 is smaller than or equal to 1 minute (for example, 1 minute), which is the second time limit, when the counter value of the second time-limit timer 80 continues to be incremented. The fourth predetermined counter value Y2 is set so that a time length required for the counter value of the second suspend-time timer 81 to reach the fourth predetermined counter value Y2 is a time long enough for the temperatures of the contactor coils to be lowered to the temperature of the safe level (for example, four minutes), when the counter value of the second suspend-time timer 81 continues to be incremented.

In the third preferred embodiment, the microcomputer constitutes the controller 85, and the controls of the contactors 2 and 3 and the functions of the first time-limit timer 40, the first suspend-time timer 41, the second time-limit timer 80 and the second suspend-time timer 81 are executed by a program stored in a computer readable recording medium.

Referring to FIGS. 9 and 10, the contactor control method in the contactor control apparatus for the electric vehicle according to the third preferred embodiment constituted as described above. FIG. 9(a) shows a change of the voltage applied to the coils, FIG. 9(b) shows a change of the counter value of the first time-limit timer 40, and FIG. 9(c) shows a change of the counter value of the first suspend-time timer 41, FIG. 9(d) shows a change of the counter value of the second time-limit timer 80, FIG. 9(e) shows a change of the counter value of the second suspend-time timer 81, and FIG. 9(f) shows a change of the operation of the second contactor 3.

The voltage applied to the coils starts to increase at a timing T1 (as indicated by a point P1), and exceeds Vclr (15V) at a timing T1' (as indicated by a point P55). At this timing, the controller 85 clears or resets the counters of the first suspend-time timer 41 and the second suspend-time timer 81 (as indicated by points P56 and P105).

The voltage applied to the coils exceeds Vref1 (16V) at a timing T2 (as indicated by a point P2). At this timing, the controller 85 starts to increment the counter value of the first time-limit timer 40 (as indicated by a point P3). The voltage applied to the coils continues to increase, and exceeds Vref2 (18V) at a timing T2' (as indicated by a point P90). At this timing, the controller 85 starts to increment the counter value of the second time-limit timer 80 (as indicated by a point P91).

At a timing T3, the voltage applied to the coils sharply drops due to various factors, such as the exchange of the auxiliary battery, and falls below Vref2 (18V), Vref1 (16V) and Vclr (15V) (as indicated by a point P4). At this timing, the controller 85 stops to increment the counters of the first time-limit timer 40 and the second time-limit timer 80 (as indicated by points P5 and P92). The controller 85 further increments the counter values of the first suspend-time timer 41 and the second suspend-time timer 81 (as indicated by points P50 and P97).

At a timing T4, the voltage applied to the coils starts to increase again, and exceeds Vclr (15V), Vref1 (16V) and Vref2 (18V) (as indicated by a point P6). At this timing, the controller 85 restarts to increment the counters of the first time-limit timer 40 and the second time-limit timer 80 (as indicated by points P7 and P93). Further, the counters of the first suspend-time timer 41 and the second suspend-time timer 81 are cleared or reset (as indicated by points P51 and P98).

At a timing T4', the counter value of the second time-limit timer 80 reaches the third predetermined counter value X2 (as indicated by a point P94), and the controller 85 compulsorily sets the second contactor 3 in non-conductive state (OPEN) (as indicated by a point P101).

At a timing T5, the voltage applied to the coils falls below Vref2 (18V), Vref1 (16V) and Vclr (15V) again (as indicated by a point P8). Then, the controller 85 stops to increment the counters of the first time-limit timer 40 and the second time-limit timer 80 (as indicated by points P9 and P95). Further, the counters of the first suspend-time timer 41 and the second suspend-time timer 81 are incremented (as indicated by points P52 and P99). Thereafter, at a timing T6, the voltage applied to the coils exceeds Vclr (15V), Vref1 (16V) and Vref2 (18V) again (as indicated by a point P10). Then, the controller 85 restarts to increment the counters of the first time-limit timer 40 and the second time-limit timer 80 (as indicated by points P11 and P96), and clears or resets the counters of the first suspend-time timer 41 and the second suspend-time timer 81 (as indicated by points P53 and P100).

At a timing T7, the counter value of the first time-limit timer 40 reaches the first predetermined counter value X1 (as indicated by a point P12). At this timing, the controller 85 takes no action because the second contactor 3 has been already set in non-conductive state at the timing T4'.

The temperatures of the contactor coils gradually increase every time when the voltage applied to the coils exceeds Vref1 (16V) and Vref2 (18V). However, because the contactor is set in non-conductive state when the counter value of the first time-limit timer 40 reaches the first predetermined counter value X1 or when the counter value of the second time-limit timer 80 reaches the third predetermined counter value X2, the contactor coils, whose temperatures are prevented from increasing to an excessive degree and being damaged. Further, the provision of Vref1 and Vref2 allows the power supply to be reliably controlled precisely corresponding to the change of the voltage applied to the coils.

Next, referring to FIGS. 7 and 10, the contactor control method according to the third preferred embodiment is described. Since FIG. 7 has been already described, the description thereof is omitted. FIG. 10 is a flow chart for describing the contactor control method according to the third preferred embodiment. In FIG. 10, first of all, it is checked whether or not the voltage applied to the coils is higher than Vclr (15V) (at step S1000). When the voltage applied to the coils is higher than Vclr (15V), the counter value of the second suspend-time timer 81 is cleared or reset (at step S1001). When the voltage applied to the coils is lower than or equal to Vclr (15V), the counter value of the second suspend-time timer 81 is incremented (at step S1002), and the control flow proceeds to S1003.

Next, it is checked whether or not the voltage applied to the coils is higher than Vref2 (18V) (at step S1003). When the voltage applied to the coils is higher than Vref2 (18V), the counter value of the second time-limit timer is incremented (at step S1004). When the voltage applied to the coils is lower than or equal to Vref2 (18V), the control flow proceeds to S1005.

Next, it is checked whether or not the counter value of the second suspend-time timer 81 is equal to or larger than the fourth predetermined counter value Y2 (at step S1005). When the counter value of the second suspend-time timer 81 is equal to or larger than the fourth predetermined counter value Y2, the counter value of the second time-limit timer 80 is cleared or reset (at step S1006). When the counter value of the second suspend-time timer 81 is smaller than the fourth predetermined counter value Y2 in S1005, the control flow proceeds to S1007.

Next, it is checked whether or not the counter value of the second time-limit timer 80 is equal to or larger than the third predetermined counter value X2 (at step S1007). When the counter value of the second time-limit timer 80 is equal to or larger than the third predetermined counter value X2, the second contactor 3 is compulsorily set in non-conductive state (at step S1008). When the counter value of the second time-limit timer 80 is smaller than the third predetermined counter value X2 in S1007, no action is taken.

The controller 85 repeats the steps S700 to S708 shown in FIG. 7 and the steps S1000 to S1008 shown in FIG. 10 per a predetermined time (for example, 100 msec) to monitor the change of the voltage applied to the coils and prevent the excessive heat generation in the contactor coils by setting the contactor in non-conductive state within an appropriate time limit depending on the magnitude of the voltage applied to the coils.

According to the contactor control apparatus and the contactor control method for the electric vehicle of the third preferred embodiment, the first time-limit timer for incrementing the counter value thereof when the voltage applied to the coils is higher than Vref1, the second time-limit timer for incrementing the counter value thereof when the voltage applied to the coils is higher than Vref2, and the first suspend-time timer and the second suspend-time timer for respectively incrementing the respective counter value thereof when the voltage applied to the coils is lower than or equal to Vclr are provided. The contactor is compulsorily set in non-conductive state when the counter value of the first time-limit timer reaches the first predetermined counter value or when the counter value of the second time-limit timer reaches the second predetermined counter value. The counter of the first time-limit timer is cleared or reset when the counter value of the first suspend-time timer reaches the second predetermined counter value. Further, the counter value of the second time-limit timer is cleared or reset when the counter value of the second suspend-time timer reaches the fourth predetermined counter value. This leads to that the excessive heat generation in the contactor coils can be prevented, and the number of stop of the vehicle can be further reduced when the voltage applied to the coils is often increased. The two reference voltage values, which are the first reference voltage value (Vref1) and the second reference voltage value (Vref2), are used to allow the power supply to be reliably controlled flexibly corresponding to the change of the voltage applied to the coils.

The second time-limit timer 80 increments or decrements the counter value starting from an initial value by a certain value per a certain time interval so that the time when the voltage applied to the coils is higher than second reference voltage Vref2, which is different from the reference voltage Vref1, is counted. The time when the voltage applied to the coils is lower than or equal to the reference voltage Vref2 is not included in the counting. When the counter value of the second time-limit timer 80 reaches the third predetermined counter value, it is determined that the temperatures of the contactor coil are beyond the normal range. At this timing, the controller 85 compulsorily sets at least one of the contactors 2 and 3 in non-conductive state to disconnect the voltage supply path from the battery assembly 1 to the load of the vehicle so that the vehicle is stopped. The third predetermined counter value is preferably set to a time length shorter than a time length when the temperatures of the contactor coils are not excessively increased and the first time-limit timer 40 executes the counting based on the first predetermined counter value when the second reference voltage Vref2 is higher than the first reference voltage Vref1. Further, the third predetermined counter value is preferably set to a time length longer than the time length when the temperatures of the contactor coils are not excessively increased and the first time-limit timer 40 executes the counting based on the first predetermined counter value when the second reference voltage Vref2 is lower than the first reference voltage Vref1.

The second suspend-time timer 81 increments or decrements the counter value starting from an initial value by a certain value per a certain time interval so that the time when the voltage applied to the coils is lower than or equal to the suspend-time timer counter clear voltage Vclr, that is when the voltage applied to the coils is sufficiently low, is counted. An arbitrary value lower than or equal to the second reference voltage Vref2 is preferably set to the suspend-time timer counter clear voltage Vclr. When the counter value of the second suspend-time timer 81 reaches the fourth predetermined counter value, it is determined that the temperatures of the contactor coils are sufficiently low, and the counter value of the second time-limit timer 80 is accordingly cleared or reset. The fourth predetermined counter value is preferably set to a time length long enough for the temperatures of the contactor coils to be lowered to the temperature of the safe level and a time length longer than a time length when the first suspend-time timer 41 executes the counting based on the second predetermined counter value when the second reference voltage Vref2 is higher than the first reference voltage Vref1. On the contrary, the fourth predetermined counter value is preferably set to the time length long enough for the temperatures of the contactor coils to be lowered to the temperature of the safe level and a time length shorter than the time length when the first suspend-time timer 41 executes the counting based on the second predetermined counter value when the second reference voltage Vref2 is lower than the first reference voltage Vref1. The suspend-time timer counter clear voltage Vclr of the first suspend-time timer 41 and the suspend-time timer counter clear voltage Vclr of the second suspend-time timer 81 may be set to values different to each other.

According to the present invention, because second time-limit timer 80 and the second suspend-time timer 81 are provided, the contactor is not set in non-conductive state until the counter value of the second time-limit timer 80 reaches the third predetermined counter value even when the change of the voltage of the auxiliary battery frequently occurs and the voltage applied to the coils exceeds the second reference voltage Vref2. As a result, the number of stop of the vehicle can be reduced. When the counter value of the second time-limit timer 80 reaches the third predetermined counter value, at least one of the contactors 2 and 3 is compulsorily set in non-conductive state, which prevents the excessive heat generation in the contactor coils. Further, when the second reference voltage Vref2, which is different from the first reference voltage Vref1, is provided, the power supply can be reliably controlled more precisely corresponding to the change of the voltage applied to the coils.

According to the respective preferred embodiments of the present invention, the controller sets the second contactor 3 in non-conductive state when the counter value of the first time-limit timer reaches the first predetermined counter value X1 or when the counter value of the second time-limit timer reaches the third predetermined counter value X2. Instead of the above configuration, the same effect can be obtained when the first contactor 2 is set in non-conductive state, or the contactors 2 and 3 are both set in non-conductive state. In terms of safety, the second contactor 3, which is connected to the low-voltage side of the battery assembly 1, is preferably set in non-conductive state.

Vclr is provided as the reference voltage commonly used for clearing or resetting the timers of the first suspend-time timer 41 and the second suspend-time timer 81. However, the first suspend-time timer 41 and the second suspend-time timer 81 may be respectively provided with a first suspend-time timer counter clear voltage (Vclr1) and a second suspend-time timer counter clear voltage (Vclr2).

In the preferred embodiments of the present invention, the counter value of the first time-limit timer continues to be incremented whenever the voltage applied to the coils is higher than Vref1 irrespective of the status of the second contactor 3. However, the present invention is not limited thereto. The same effect can be obtained in the case that the counter value is cleared or reset when the second contactor 3 is in non-conductive state (OPEN). In the same manner, the counter value of the second time-limit timer the counter value incremented whenever the voltage applied to the coils is higher than Vref2 irrespective of the status of the second contactor 3. However, the present invention is not limited thereto. The same effect can be obtained in the case that the counter value is cleared or reset when the second contactor 3 is in non-conductive state (OPEN).

In the preferred embodiments of the present invention, the counter value of the first suspend-time timer continues to be incremented whenever the voltage applied to the coils is lower than or equal to Vclr irrespective of the status of the second contactor 3 and the counter value 6 of the first time-limit timer. However, the present invention is not limited to such a configuration. The same effect can be obtained in the case that the counter value is cleared or reset when the second contactor 3 is in non-conductive state (OPEN) and/or the counter value of the first time-limit timer shows the initial value. In the same manner, the counter value of the second suspend-time timer continues to be incremented whenever the voltage applied to the coils is lower than or equal to Vclr irrespective of the status of the second contactor 3 or the counter value of the second time-limit timer. However, the present invention is not limited to such a configuration. The same effect can be obtained in the case that the counter value is cleared or reset when the second contactor 3 is in non-conductive state (OPEN) and/or the counter value of the second time-limit timer shows the initial value.

In the preferred embodiments of the present invention, the two reference voltages of Vref1 and Vref2 are used to monitor the change of the voltage applied to the coils. However, the present invention is not limited to the two reference voltages. It goes without saying that the reliable power-supply control precisely corresponding to the change of the voltage applied to the coils can be carried out using at least three reference voltages. Further, since each reference voltage and time limit are required to set to different values depending on the rated voltage of the contactor coils. Each value of the first time limit, the second time limit, Vref1, Vref2 and Vclr provided in the preferred embodiments of the present invention are only the examples presented in order to simplify the description. The present invention is not limited to the mentioned values.

The present invention can be used as a contactor control apparatus in electric vehicles such as an electric vehicle and a hybrid vehicle.

Although the present invention has been described with respect to its preferred embodiments in some detail, the disclosed contents of the preferred embodiments may change in the details of the structure thereof, and any changes in the combination and sequence of the component may be attained without departing from the scope and spirit of the claimed invention.

What is claimed is:

1. A contactor control apparatus comprising:

a controller for turning on and off a first contactor, connected to one end of a battery assembly including at least one secondary battery connected in series, and a second contactor connected to another end of the battery assembly, wherein the controller counts a first counter value when a control voltage for controlling each contactor is higher than a first reference voltage, and holds the first counter value when the control voltage is lower than or equal to the first reference voltage, and wherein the controller turns off at least one of the first contactor and the second contactor when the first counter value is equal to or larger than a first threshold value.

2. The contactor control apparatus claimed in claim 1, wherein the controller counts a second counter value when the control voltage is lower than or equal to a first reset voltage lower than or equal to the first reference voltage, and resets the second counter value when the control voltage is higher than the first reset voltage, and wherein the controller resets the first counter value when the second counter value is equal to or larger than a second threshold value.

3. The contactor control apparatus claimed in claim 2, wherein the controller counts a third counter value when the control voltage is lower than or equal to a second reset value lower than or equal to a second reference voltage that is different from the first reference voltage, and resets the third counter value when the control voltage is higher than the second reset voltage, wherein the controller counts a fourth counter value when the control voltage is higher than the second reference voltage, and holds the fourth counter value when the control voltage is lower than or equal to the second reference value, wherein the controller resets the fourth counter value when the third counter value is equal to or larger than a third threshold value, and wherein the controller further turns off at least one of the first contactor and the second contactor when the fourth counter value is equal to or larger than a fourth threshold value.

4. A contactor control method for use in a contactor control apparatus, said method including:

a control step of turning on and off a first contactor connected to one end of a battery assembly comprising at least one secondary battery connected in series, and a second contactor connected to another end of the battery assembly, wherein the control step includes the following steps of:

counting a first counter value when a control voltage for controlling each contactor is higher than a first reference voltage, holding the first counter value when the control voltage is lower than or equal to the first reference voltage, and turning off at least one of the first contactor and the second contactor when the first counter value is equal to or larger than a first threshold value.

5. The contactor control method claimed in claim 4, further including the following steps of:

counting a second counter value when the control voltage is lower than or equal to a first reset voltage lower than or equal to the first reference voltage, resetting the second counter value when the control voltage is higher than the first reset voltage, and resetting the first counter value when the second counter value is equal to or larger than a second threshold value.

6. The contactor control method claimed in claim 5, further including the following steps of:

counting a third counter value when the control voltage is lower than or equal to a second reset value lower than or equal to a second reference voltage that is different from the first reference voltage, resetting the third counter value when the control voltage is higher than the second reset voltage, counting a fourth counter value when the control voltage is higher than the second reference voltage, holding the fourth counter value when the control voltage is lower than or equal to the second reference value, resetting the fourth counter value when the third counter value is equal to or larger than a third threshold value, and turning off at least one of the first contactor and the second contactor when the fourth counter value is equal to or larger than a fourth threshold value.

* * * * *